United States Patent [19]
Fushimoto

[11] Patent Number: 5,136,504
[45] Date of Patent: Aug. 4, 1992

[54] MACHINE TRANSLATION SYSTEM FOR OUTPUT OF KANA/KANJI CHARACTERS CORRESPONDING TO INPUT CHARACTER KEYS

[75] Inventor: Hideo Fushimoto, Tokyo, Japan

[73] Assignee: Canon Kabushiki Kaisha, Tokyo, Japan

[21] Appl. No.: 497,350

[22] Filed: Mar. 22, 1990

[30] Foreign Application Priority Data

Mar. 28, 1989 [JP] Japan .................................. 1-73808

[51] Int. Cl.⁵ ............................................. G06F 15/38
[52] U.S. Cl. ..................................................... 364/419
[58] Field of Search ........................ 364/419, 200, 900

[56] References Cited
FOREIGN PATENT DOCUMENTS

| | | |
|---|---|---|
| 0052961 | 3/1982 | Japan . |
| 0052963 | 3/1982 | Japan . |
| 0150068 | 9/1982 | Japan . |
| 0161970 | 10/1982 | Japan . |
| 0222330 | 10/1983 | Japan . |
| 0106032 | 6/1984 | Japan . |
| 0200360 | 10/1985 | Japan . |

*Primary Examiner*—Gail O. Hayes
*Attorney, Agent, or Firm*—Fitzpatrick, Cella, Harper & Scinto

[57] ABSTRACT

An electronic dictionary of the type that first language information and corresponding second language information are stored previously, the first language information is searched using the second language information, and the searched language information is outputted in a predetermined format. The electronic dictionary includes a memory for storing as one of the first and second language information a character information and a kana character pronunciation information representative of the pronunciation of the character information, respectively in a predetermined format, a unit for converting an information expressed by a kana character into an information expressed by an alphabetical character, and a controller for converting the kana character pronunciation information representative of the character information stored in the memory into the alphabetical character information by using the conversion unit, upon activation of a predetermined operation unit. In outputting the pronunciation of a character information, the pronunciation information can be outputted with either the kana character or the alphabetical character upon selection by the operation unit.

16 Claims, 5 Drawing Sheets

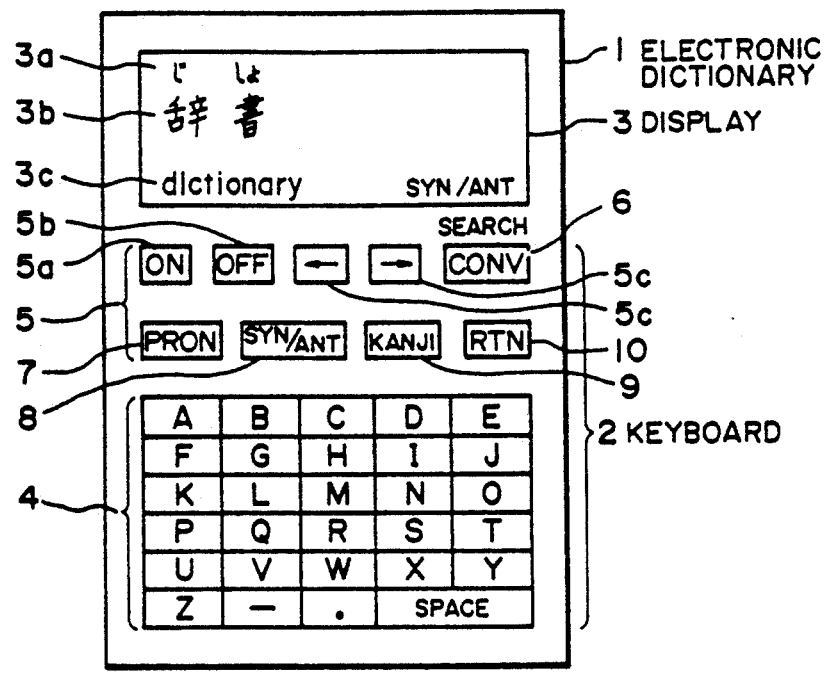
FIG. 1
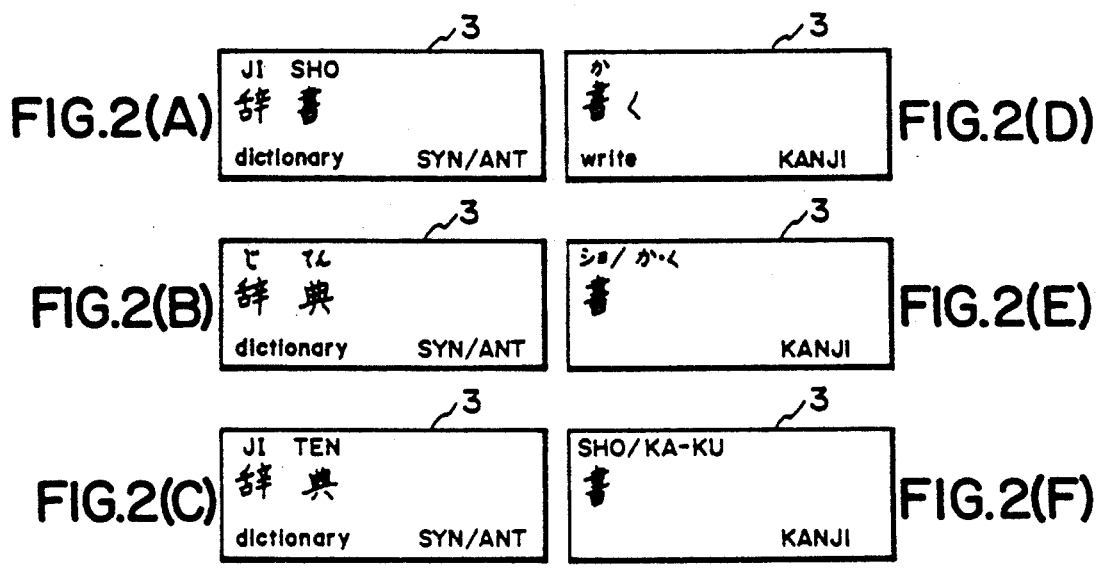

MACHINE TRANSLATION SYSTEM FOR OUTPUT OF KANA/KANJI CHARACTERS CORRESPONDING TO INPUT CHARACTER KEYS

BACKGROUND OF THE INVENTION

1. Field of the Invention

The present invention relates to an electronic dictionary, and more particularly to an electronic dictionary which stores first language information and second language information, searches for first language information using second language information, and outputs language information in a predetermined format.

2. Related Background Art

With known electronic dictionaries or electronic translators, a Japanese word or sentence for example is inputted, which is subjected to kana (inclusive of Japanese katakana and hiragana characters)/kanji (Japanese kanji character) conversion to display a translated English word or sentence equivalent to the inputted Japanese word or sentence. Translating first language information into second language information is conducted by searching a memory of a microprocessor which memory stores the first language information and second language information in one-to-one correspondence with each other, by using the first language information.

Information is outputted usually on a display such as a liquid crystal display, or it may be outputted as voices or prints as is well known.

Consider now the simplest electronic Japanese-English dictionary for example, in which a Japanese word is inputted using kana characters, and corresponding kanji representation and one or more English words or sentences are displayed. Such dictionary has no problem if a Japanese uses it in checking an English word or kanji representation corresponding to an input word.

However, a desire to learn the Japanese language is now increasing among foreigners. If a foreigner uses such a dictionary, the meaning of a kanji character corresponding to an English word can be understood because the English word together with the kanji character is outputted. However, the pronunciation of the kanji character is expressed by kana characters so that it is difficult for a foreigner to understand the pronunciation.

In view of the above, there has been proposed an electronic dictionary wherein alphabetical representation data for the pronunciation of Japanese kanji characters are previously stored in a memory and output it each time a Japanese entry word is inputted.

Most conventional electronic dictionaries store in a memory kanji character representations and their English translation equivalents, respectively for each Japanese entry word. If an alphabetical representation of an entry word is added thereto, the memory capacity increases and the cost becomes high. In addition, for a Japanese user, such alphabetical representation is not necessary and may cause the user to be confused in this translation work.

SUMMARY OF THE INVENTION

An object of the present invention is to solve the above problems and provide an electronic dictionary capable of outputting only necessary information for a user and improving the efficiency of translation work without increasing the memory capacity and making the cost high.

BRIEF DESCRIPTION OF THE DRAWINGS

FIG. 1 is a front view of an electronic dictionary according to an embodiment of this invention;

FIGS. 2A to 2F illustrate examples of displays on a display shown in FIG. 1;

DETAILED DESCRIPTION OF THE PREFERRED EMBODIMENTS

Figures 3, 4:
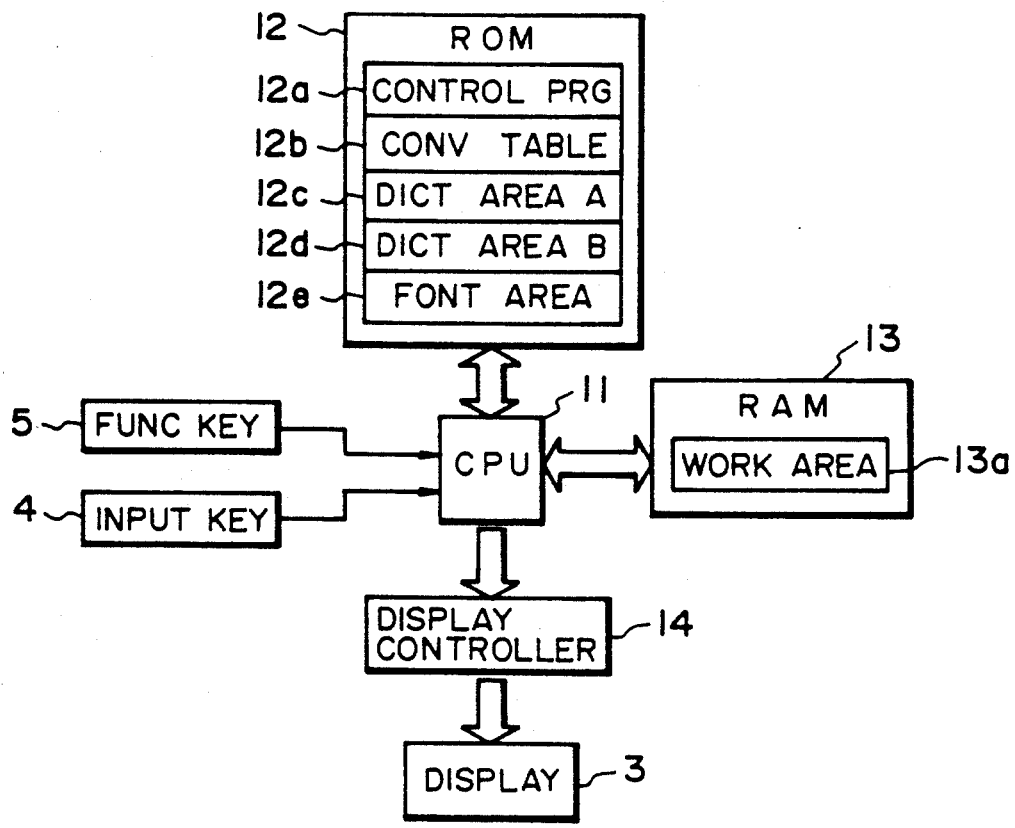
FIG. 3 is a block diagram showing the structure of a control system of the electronic dictionary shown in FIG. 1.
FIGS. 4 to 7 show memory formats of ROM shown in FIG. 3.

Embodiments of this invention will be described in detail with reference to the accompanying drawings.

1ST EMBODIMENT

FIG. 1 shows a front view of an electronic Japanese-English dictionary according to an embodiment of this invention.

Referring to FIG. 1, an electronic dictionary 1 has a keyboard 2 and a display 3 on the front side thereof. The keyboard 2 has character input keys 4 and function keys 5. The character keys 4 include alphabetical and symbol keys arranged in a 6×5 matrix. The key arrangement is not limited thereto, but various other arrangements may be used.

The display 3 includes three areas 3a, 3b and 3c. The area 3a is used for displaying a Japanese pronunciation representation for a Japanese word entered from the input keys 4 by using alphabets and converted into corresponding kana characters by using an alphabets/kana conversion table (to be described later). The area 3b is used for displaying a kana/kanji representation for a Japanese pronunciation. The area 3c is used for displaying an English word or sentence corresponding to a Japanese word or sentence.

The function keys 5 include the following keys. Keys 5a and 5b are used for turning on and off the power source of the electronic dictionary, respectively. If the key 51 is depressed while the power is being turned on, it operates as a clear key for clearing a display. Keys 5c labeled as right and left arrows are used as cursor keys which control the position of an edit cursor on the display 3.

A conversion key 6 is used for converting an input Japanese word or sentence pronunciation into a kana/kanji representation and an English word or sentence.

As shown in FIG. 1, upon entering "DICTIONARY" or "JISHO" through the input keys 4 and upon depression of the conversion key 6, a kanji representation "辞書" and corresponding Japanese pronunciation "じしょ" and the English word "dictionary" are outputted on the display in a predetermined layout.

Upon depression of a key 7 specific to this embodiment and labeled as "PRON" under the condition the English information is being displayed, the kana representation in the Japanese pronunciation area of the display 3 is converted into an alphabetical representation.

If there is an associated information such as an synonym and/or antonym regarding the searched information, the associated information is displayed upon depression of a key 8 labeled as "SYN/ANT".

A kanji key 9 is used for searching a pronunciation of a single kanji different from the displayed pronunciation. A return key 10 is used to output again the information the user first searched, after displaying the associated information or an alphabetical pronunciation representation.

Examples of displays on the display 3 according to this embodiment are shown in FIG. 2.

Upon depression of the PRON key 7 under the display condition shown in FIG. 1, the Japanese pronunciation representation "じしょ" (in the area 3a) is converted into an alphabetical pronunciation representation by using the alphabets/kana conversion table. The combined outputs are shown in FIG. 2A.

Alphabetical characters "JISHO" are displayed, at positions corresponding to kanji characters, in the area 3a above the representation "辞書" in the kanji display area 3b. The Japanese pronunciation for each kanji character can be recognized by the alphabetical characters, to thereby allow a correct pronunciation.

A SYN/ANT flag displayed on the display 3 indicates that the associated information with the searched information is present. Upon depression of the SYN/ANT key 8 under such a condition, a synonym "辞典" is displayed as shown in FIG. 2B. Under this condition, upon depression of the PRON key 7, a Japanese pronunciation thereof is displayed by an alphabetical pronunciation representation as shown in FIG. 2C.

Upon depression of the return key 10 under the condition shown in FIG. 2C, the display when the search was first conducted is again outputted as shown in FIG. 1.

FIG. 2D shows the display obtained when "WRITE" or "KAKU" is entered through the input keys 4 and the conversion key 6 is depressed. There are displayed on the display 3 a kana/kanji representation "書く" corresponding to "かく" and its English translation "write".

Under the condition shown in FIG. 2D where a kanji flag is displayed on the display 3, upon depression of the kanji key 9, rendered-into-Japanese pronunciation and additional phonetic pronunciation are displayed as shown in FIG. 2E. Upon further depression of the PRON key 7, the rendered-into Japanese/phonetic pronunciation display is converted into and outputted as an alphabetical character representation. In this manner, only by inputting "WRITE" or "KAKU" and performing conversions, another phonetical pronunciation for "書" can be learned at the same time thus allowing to use the electronic dictionary more conveniently.

The arrangement for realizing the above-described operation and function will be described in detail below. FIG. 3 shows the arrangement of the control system of the electronic dictionary shown in FIG. 1.

As illustrated in FIG. 3, in the control system, a main controller CPU 11 controls the circuits of the dictionary in accordance with programs stored in ROM 12.

Under control of CPU 11, Japanese information entered from the input keys 4 are converted into kana characters by using an alphabets/kana conversion table 12b stored in first storage means ROM 12.

The character information is transferred into a work area 13a in a RAM 13 to which also transferred is the information of the characters to be outputted to the display 3 after searching a dictionary area (A) 12c, the characters being stored in a FONT area 12e. After arranging the display format, a display controller 14 controls the display 3 to output the searched contents supplied from CPU 11.

Upon depression of the PRON key 7 among the function keys 5 after outputting and displaying the searched contents on the display 3, the kana pronunciation information (information displayed in the area 3a of the display 3) within the information temporarily stored in the work area 13a of RAM 13 is again converted into an alphabetical character representation information by using the alphabets/kana conversion table 12b. The converted alphabetical character representation information is transferred back to the work area 13a and displayed on the display 3 after arranging the display format.

Upon depression of the kanji key 9 after outputting and displaying the searched contents as shown in FIG. 2D, the dictionary area (B) 12d storing kanji information is searched to obtain the corresponding information which is then transferred to the work area 13a at a different address and outputted to the display 3 after arranging the display format. Upon depression of the PRON key 7 under this condition, similar to the above, the Japanese pronunciation data is converted, by using the alphabets/kana conversion table 12b, into alphabetical characters which are in turn displayed.

Upon depression of the return key 10 under the condition shown in FIG. 2F, the initially searched information temporarily stored in the work area 13a is again outputted to the display 3 via the display controller 14. If characters are newly entered and the conversion key 6 is depressed, the previous data in the work area 13a are erased, and the new data are maintained stored unless the power supply of the dictionary is turned off.

The alphabets/kana conversion table 12b stored in ROM 12 is constructed such that each unit character pronunciation in a Japanese pronunciation area 12j is arranged in one-to-one correspondence with each unit character pronunciation in an English pronunciation area 12e. Accordingly, if kana or alphabetical character information is supplied, the corresponding alphabetical or kana information is outputted.

Figure 5:
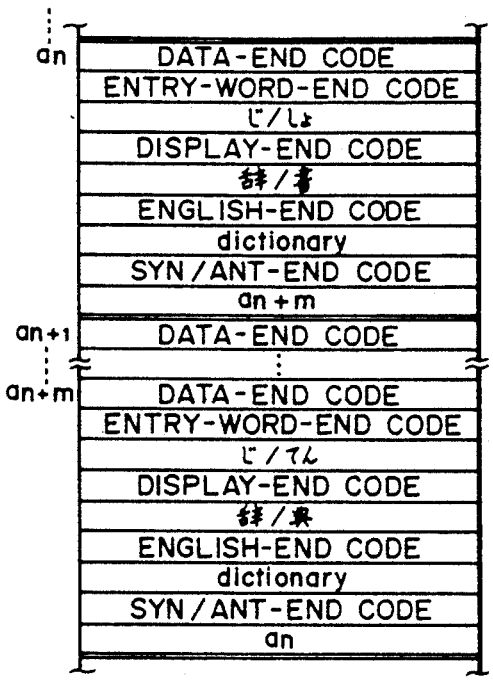
Figure 6:
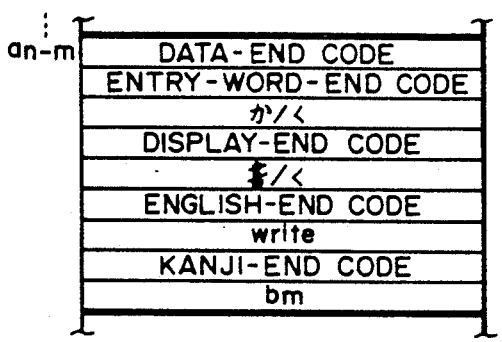

FIGS. 5 and 6 show the memory formats in the dictionary area 12c. At respective addresses a/n−m, . . . , a/n, a/n+1, . . . , a/n+m of the dictionary 12c, there are stored a Japanese word pronunciation, kana/kanji representation, English word, SYN/ANT address, and kanji information address in this order, SYN/ANT address, and kanji information address in this order, while entry-work-end code as an end code and discrimination code, display-end code, English-end code, SYN/ANT-end code or kanji-end code is interposed therebetween. Each entry word information is arranged distinguisheable by a data-end code.

If "JISHO" is entered from the input keys 4, conversion from the alphabetical characters "JISHO" into kana characters "じしょ" is carried out using the alphabets/kana conversion table 12b, the "じしょ" being displayed in the area 3a of the display 3.

Upon depression of the conversion key 6, a coincidence judgement for the entry information relative to the dictionary area 12c is carried out by using the control program 12a. The coincident information at an address a/n is read and developed on the work area 3a of RAM 13 into a predetermined display format in accordance with the end codes. In addition, the display font data corresponding to character codes constituting the coincident information are read from a font area 12e and combined together to display the results on the display 3. Since there is present the SYN/ANT-end code, a SYN/ANT flat is displayed on the display 3 at the same time.

Upon depression of the SYN/ANT key 8 under this condition, by using the control program 12a the SYN/ANT information is read from the dictionary area 12c at the address a/n+m which is stored below the SYN/ANT-end code. The read information is displayed on the display 3 as described previously.

In the above case, the read information is temporarily stored in the work area 13a of RAM 13 at a different address at which the information following the address a/n is temporarily stored. In this manner, upon depression of the return key 10 after displaying the SYN/ANT information, the information initially searched can be immediately displayed on the display 3.

Upon depression of the PRON key 7 under the condition where "**" is displayed as the SYN/ANT information on the display 3, a Japanese pronunciation information "ᠴᠢᠯ" following the address a/n+m of the work area 13a is searched and converted again into an alphabetical character information or character codes "JITEN" by using the alphabets/kana conversion table 12b in ROM 12 under the control by CPU 11. The character codes are transferred to the work area 13a at its pronunciation information area to thereby read the display font data corresponding to the character codes from the font area 12e, the display font data being combined together to display it on the display 3.

Referring to FIG. 6, if "WRITE" or "KAKU" is inputted from the input keys 4 and the conversion key is depressed, the information in the dictionary area 2c at an address lower than the address a/n−m where the coincident information was searched, is read. The read information is displayed on the display in the above-described manner. In this case, since the kanji-end code is present, the kanji flag is displayed on the display 3 at the same time.

Figure 7:
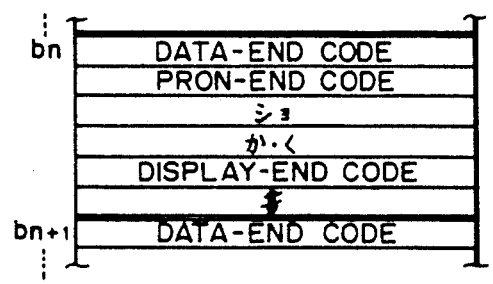

Upon depression of the kanji key 9 under this condition, the address b/n of the dictionary area 12d for the kanji information is read, the coincident information is read from the dictionary area at the address b/n (FIG. 7) and transferred to the work area 13a under the control by CPU 11. The transferred data are arranged into a predetermined format in accordance with the end codes, and the font data in the font area 12e are combined together to display it on the display 3. Upon depression of the PRON key 7, in accordance with the kana pronunciation data stored lower than the pronunciation-end code at the address b/n, the kana/alphabets conversion is carried out in the similar manner as above. The alphabetical characters as the pronunciation information are combined together to display it on the display 3.

Next, the operation of the arrangement described above will be described in detail with reference to FIG. 8 which illustrates the control procedure by CPU 11 stored in the control program area 12a shown in FIG. 3.

In entering a Japanese pronunciation and outputting a corresponding kanji representation and English translation, first at step S1 an alphabetical character is inputted from the input key 4. At step S2 the kana character corresponding to the inputted alphabetical character is searched using the alphabets/kana table 12b. If there is a coincident alphabetical character, the corresponding kana character is displayed on the display 3 at step S3. At step S4 it is judged if the conversion key 6 is depressed. If each of the judgement steps S1, S2 and S4 are negated, these steps are repeated. In the above manner, a Japanese word is entered while performing alphabets/kana conversion.

Upon depression of the conversion key 6 after inputting the Japanese pronunciation, at a loop composed of steps S5 to S7, an input word is searched from the dictionary area 12c of ROM 12. In this case, the head address A of the dictionary area 12c from which the input word is searched is determined in accordance with the head character of the input word. A word in the dictionary area 12c at the address A is outputted and compared with the input word at step S6. If the searched word is not identical to the input word, the address A of the dictionary area 12c is incremented to the next address and the flow returns to step S5.

If the searched word is identical to the input word, the flow advances to step S8. At step S8, all the information A such as kanji representation information, English translation information, and dictionary addresses of the SYN/ANT information or kanji information, respectively following the searched entry word in the dictionary area 12c, are stored in the work area 13a of RAM 13 while being partitioned by the discrimination codes.

Next, at step S9 the data are composed by the discrimination codes in the display format. At the same time, the character font data for respective character codes are transferred from the font area 12e and composed together. The composed data are displayed via the display controller 14 on the display 3 at step S10. In this case, if there is the address information of the SYN/ANT information or kanji information, the SYN/ANT or kanji flag is displayed at the same time on the display 3.

The operations from steps S1 to S10 are the fundamental search operations.

Under the condition that the kanji representation and English translation for one pronunciation are being displayed, it is judged at step S11 if the PRON key 7 is operated.

Upon depression of the PRON key 7, i.e., upon instruction to convert a kana pronunciation representation into the alphabetical character pronunciation representation, the pronunciation data Y for the information A is read from RAM 13 at step S12. At step S12, the kana pronunciation representation is converted into the alphabetical character pronunciation representation in accordance with the alphabets/kana conversion table 12b in ROM 12.

At step S13, if there is no corresponding alphabetical character data, executed is an error process the details of which are omitted herein. The character data converted into the alphabetical character data at step S13 are stored in the work area 13a of RAM 13 at step S14.

At step S15, similar to step S9, the alphabetical character pronunciation data are combined with the kanji representation data and English translation data in accordance with the discrimination codes, and at step S16, the combined data are displayed on the display 3. Under this condition, depression of the return key 10 is awaited at step S17.

Upon depression of the return key at step S17, the flow returns to step S9 at which the contents obtained at the initial search are composed. At step S10 the composed information, i.e., the search contents by the kana character pronunciation, is displayed on the display 3.

If the return key 10 is not depressed at step S10, it is judged that a new input word is awaited so that the flow returns to step S1 to check the presence or absence of a new input word.

A process of displaying an alphabetical character pronunciation upon depression of the PRON key 7 at step S11 has been described above. On the contrary, if the PRON key 7 is not depressed at step S11, it is checked at steps S18 and S19 whether the SYN/ANT key 8 and kanji key 9 are depressed or not.

In both the cases where the SYN/ANT key 8 and kanji key 9 are not depressed at steps S18 and S19 and where the SYN/ANT key 8 and kanji key 9 are depressed under the condition that the searched data do not include the SYN/ANT information and kanji information at steps S20 and S25, i.e., the display 3 does not display the SYN/ANT flag and kanji flag, the flow returns to step S1 to await a new word input. In the latter case the depression of the keys are considered a non-operation.

If the SYN/ANT key 8 is depressed at step S18 and there is the SYN/ANT information at step S20, the flow advances to the process to output the SYN/ANT information. Namely, at step S21 in accordance with the head address information of the dictionary area 12c regarding the SYN/ANT information, the of RAM 13 while being partitioned by the discrimination codes.

Next, immediately after the data are composed by the discrimination codes in the display format at step S22, the character font data for respective character codes are transferred from the alphabetical character area 12e and composed together to display it at step S23. In this manner the SYN/ANT information is displayed.

Next, a depression of the PRON key 7 is waited at step S24 to determine whether the pronunciation data are converted. Upon depression of the PRON key 7, the flow returns to step S12 to perform the alphabetical character pronunciation representation processing. If the PRON key 7 is not depressed, the flow returns to step S17 to await a depression of the return key 10 for returning to the initial state in the manner as described above.

If the kanji key is depressed at step S19 and there are kanji data at step S25, the kanji information C is extracted from the dictionary area B 12d in accordance with the address information indicating the dictionary area B 12d, and the extracted information is stored in the work area 13a of RAM 13. The flow then advances to step S22 to perform the abovedescribed processes.

According to the first embodiment, under the condition when the English information corresponding to an Japanese input is searched and displayed, if the PRON key 7 is depressed, the kana pronunciation information can be converted into alphabetical characters. Therefore, the pronunciation can be easily understood even by a beginner. In addition, the conversion into the alphabetical character pronunciation is used during the display of a searched single kanji and during the display of SYN/ANT information. Further, in this embodiment, the stored information expressed by kana characters can be converted into and displayed as corresponding alphabetical character information, thereby alleviating the necessity of additional storage capacity for alphabetical character pronunciation as opposed to a conventional.

Furthermore, the alphabetical character conversion means can be used reciprocally so that a Japanese character input may be carried out by using alphabetical characters. This is convenient for a foreigner.

2ND EMBODIMENT

The first embodiment is associated with a Japanese-English electronic dictionary. In the second embodiment, an English-Japanese dictionary will be described which has the following arrangement.

Figure 9A:
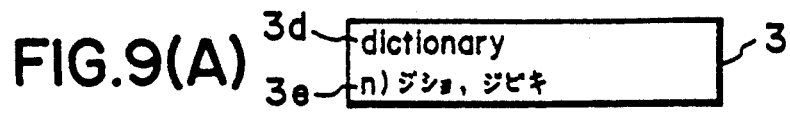
FIGS. 9A and 9B show examples of displays according to another embodiment.

Referring to FIG. 9A, the display 3 has an area 3d for displaying an input entry English word and an area 3e for displaying a corresponding Japanese translation and its part of speech.

Figure 9B:
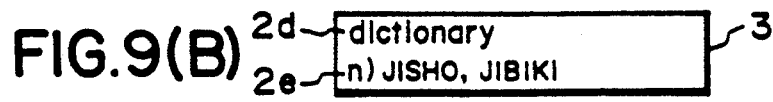

Similar to the above-described operation, upon depression of the PRON key 7, each character data constituting a Japanese word is converted into an alphabetical character by using a kana/alphabets conversion table in ROM to thereby display a Japanese translation expressed by alphabetical characters as shown in FIG. 9B. In this manner even an operator who cannot understood kana characters can understood the kana pronunciation.

Figure 10:
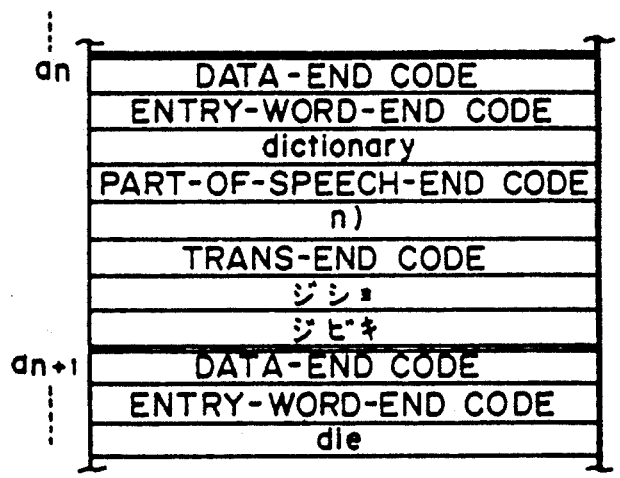
FIG. 10 shows a memory format of ROM for the display control as shown in FIG. 9.

FIG. 10 shows a memory map of the dictionary area used in the English-Japanese electronic dictionary, the memory map illustrating the storage contents associated with an English word "dictionary" by way of example. The information as illustrated is sequentially stored from the head address a/n. At the address a/n there is provided a data-end code for indicating the information group associated with the English word "dictionary". The end codes indicating the ends of respective information contents are provided for each entry word, part of speech, translation equivalent and the like. The display position information is added to the data in the work area 13a in accordance with the end codes, and the resultant data are displayed on the display 3.

Upon depression of the PRON key 7, the information following the translation-end code as the discrimination code is read from the work area 13a. Each character of the information is converted into an alphabetical character by using the kana/alphabets conversion table in ROM 12. The converted data are again stored in the work area 13a together with the discrimination information. The character font data are then provided to thereby display them on the display as shown in FIG. 9B.

As described above, even with the English-Japanese electronic dictionary, the pronunciation representation can be converted into alphabetical characters with the same advantageous effects as the first embodiment.

3RD EMBODIMENT

In the first embodiment, in obtaining the alphabetical character representation, the PRON key 7 is depressed so that the kana character representation is converted into an alphabetical character representation which is then displayed on the area 3a of the display 3. There is a case where a learner is not familiar with the kana character pronunciation. In such a case, it becomes more understandable if the alphabetical character representation is displayed simultaneously with the kana character representation.

Figure 11:
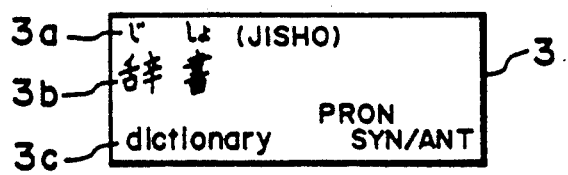
FIG. 11 shows an example of a display according to another embodiment.

As shown in FIG. 11, in the third embodiment, there is provided a mode (with PRON flag illuminated) wherein upon depression of the PRON key 7 both the kana and alphabetical characters are displayed at the same time. Namely, as illustrated, there are displayed at the same time "じしょ", "JISHO", kanji representation and English translation.

As described above, since there is provided the mode wherein pronunciation can be displayed by both kana and alphabetical character representations, both the representations are obtained without complicated operations by a user.

The above processing can be readily realized by executing the processing made upon depression of the PRON key 7, at the same time when the display composition in the work area is executed.

In the above embodiments, the pronunciation of a kanji character has been described. It is apparent that the invention is also applicable to other types of characters and output devices.

As apparent from the foregoing description of this invention, the electronic dictionary of the type that first language information and second language information are stored, the first language information is searched using the second language information, and the searched language information is outputted in a predetermined format, includes: storage means for storing as one of the first and second language information a character information and a kana character pronunciation information representative of the pronunciation of the character information, respectively in a predetermined format; means for converting an information expressed by a kana character into an information expressed by an alphabetical character; and control means for converting the kana character pronunciation information representative of the character information stored in said storage means into the alphabetical character information by using said conversion means, upon activation of predetermined operation means. Accordingly, in outputting the pronunciation of a character information, the pronunciation information can be outputted with either the kana character or the alphabetical character upon selection by the operation means, thereby allowing even a beginner to readily understand the pronunciation of the character information without outputting unnecessary information. With the above arrangement, it is not necessary to store both kana and alphabetical character pronunciation representations, thereby reducing the memory capacity of the storage means.

What is claimed is:

1. An electronic dictionary comprising:
   input means for inputting character information;
   display means for displaying at least three different types of character information corresponding to said character information inputted by said input means;
   storage means for storing said at least three types of character information to be displayed by said display means and a table storing two types of character information among said at least three types of character information in one-to-one correspondence with respect to each unit character of said two types of character information;
   translating means for translating the input character information of one type into character information of another type by retrieving information from the table stored in said storage means; and
   control means for controlling said display means to display the character information of the another type corresponding to input character information of the one type.

2. An electronic dictionary according to claim 1, wherein said at least three types of character information comprise an alphabetical character, kanji character, and kana character.

3. An electronic dictionary according to claim 2, wherein said control means controls said display means to display a kana character by using an alphabetical character which is pronounced with substantially the same phonetical sound as that of the kana character.

4. An electronic dictionary according to claim 2, wherein said display means displays an alphabetical character retrieved from said storage means by said control means exclusively of or inclusively of the kana character before conversion.

5. An electronic dictionary according to claim 1, wherein the character information displayed on said display means comprises a kanji character, hiragana character and katakana character.

6. An electronic dictionary according to claim 3, wherein said control means controls said display means to display a kana character by using an alphabetical character which is pronounced with substantially the same phonetical sound as that of the kana character.

7. An electric dictionary according to claim 5, wherein said display means displays an alphabetical character retrieved from said storage means by said control means exclusively of or inclusively of the kana character before conversion.

8. An electronic dictionary comprising:
   input means for inputting character information
   translating means for translating, if the character information inputted by said input means is a first language information, said first language information into a second language information;
   display means for displaying at least one type of character information belonging to said first language information and at least one type of character information belonging to said second language information;
   storage means for storing a table storing the character information belonging to said first language information and the character information belonging to said second language information in one-to-one correspondence with each unit character, wherein said translating means translates the inputted first language information into said second language information by retrieving information from the table stored in said storage means;
   control means for controlling said display means to display the character information belonging to said second language information and to display corresponding character information belonging to said first language information by using said table stored in said storage means thereby allowing the operator to pronounce said character information belonging to said second language information by using the corresponding character information belonging to said first language information.

9. An electronic dictionary according to claim 8, wherein said character information belonging to said first language information displayed on said display means is an alphabetical character, and at least one type of character information belonging to said second language information is a kana character.

10. An electronic dictionary according to claim 9, wherein a kana character of the character information displayed on said display means is one of a hiragana character and katakana character.

11. An electronic dictionary comprising:

input means for inputting character information;

display means for displaying a plurality of different character information belonging to the same pronunciation type as that of the character information inputted by said input means;

storage means for storing a table storing one of said plurality of character information displayed on said display means and the character information inputted by said input means in one-to-one correspondence with each unit character;

translating means for translating said inputted character information into said one of said plurality of character information stored in the table by retrieving said one of said plurality of character information from the table stored in said storage means; and control means for controlling said display means to display said plurality of character information and to display the corresponding character information inputted by said input means in accordance with said table stored in said storage means.

12. An electronic dictionary according to claim 11, wherein said plurality of character information displayed on said display means comprise a kanji character and kana character, and said character information inputted by said input means comprises an alphabetical character.

13. An electronic dictionary according to claim 11, wherein said table in said storage means stores character information, with a kana character being in correspondence with an alphabetical character.

14. An electronic dictionary according to claim 12, wherein said table in said storage means stores character information, with a kana character being in correspondence with an alphabetical character.

15. An electronic dictionary comprising:

input means for inputting character information;

storage means including first and second areas for storing a plurality of different types of character information pronounced with substantially the same phonetic sound as that of the character information inputted by said input means and a third area for storing character information associated with, and of a type pronounced with a different phonetic sound from that of the character information inputted by said input means;

display means for displaying character information stored in said first, second, and third areas of said storage means;

first translation means for translating the inputted character information into the type of character information stored in said first area by retrieving information from and for instructing said display means to display corresponding character information from said first area of said storage means;

second translation means for translating character information in said first area displayed by said display means into the type of character information in said second area by retrieving corresponding information from said second area and for instructing said display means to display the information retrieved from said second area;

third translation means for translating the character information in said first or second area displayed by said display means into the character information of the type stored in said third area by retrieving corresponding information from said third area and for instructing said display means to display the information retrieved from said third area;

fourth translation means for translating the character information translated by one of said first, second, and third translation means into the character information inputted by said input means, and for instructing said display means to display the character information inputted by said input means translated by said fourth translation means; and control means, responsive to actuation of said first, second, third, or fourth translation means for controlling said display means to display the character information instructed by said first, second, third, or fourth translation means.

16. An electronic dictionary according to claim 15, wherein the character information stored in said first area of said storage means is set to a kana character and the character information stored in said second area is set to an alphabetical character.

* * * * *

UNITED STATES PATENT AND TRADEMARK OFFICE
CERTIFICATE OF CORRECTION

PATENT NO.  : 5,136,504
DATED       : August 4, 1992
INVENTOR(S) : Hideo Fushimoto It is certified that error appears in the above-identified patent and that said Letters Patent is hereby corrected as shown below:

On the title page:
[56] References Cited
    FOREIGN PATENT DOCUMENTS

Line 5, change "0222330  10/1983 Japan" to --0222330  12/1983 Japan--.

Sheet 4 OF THE DRAWINGS

Figure 8:
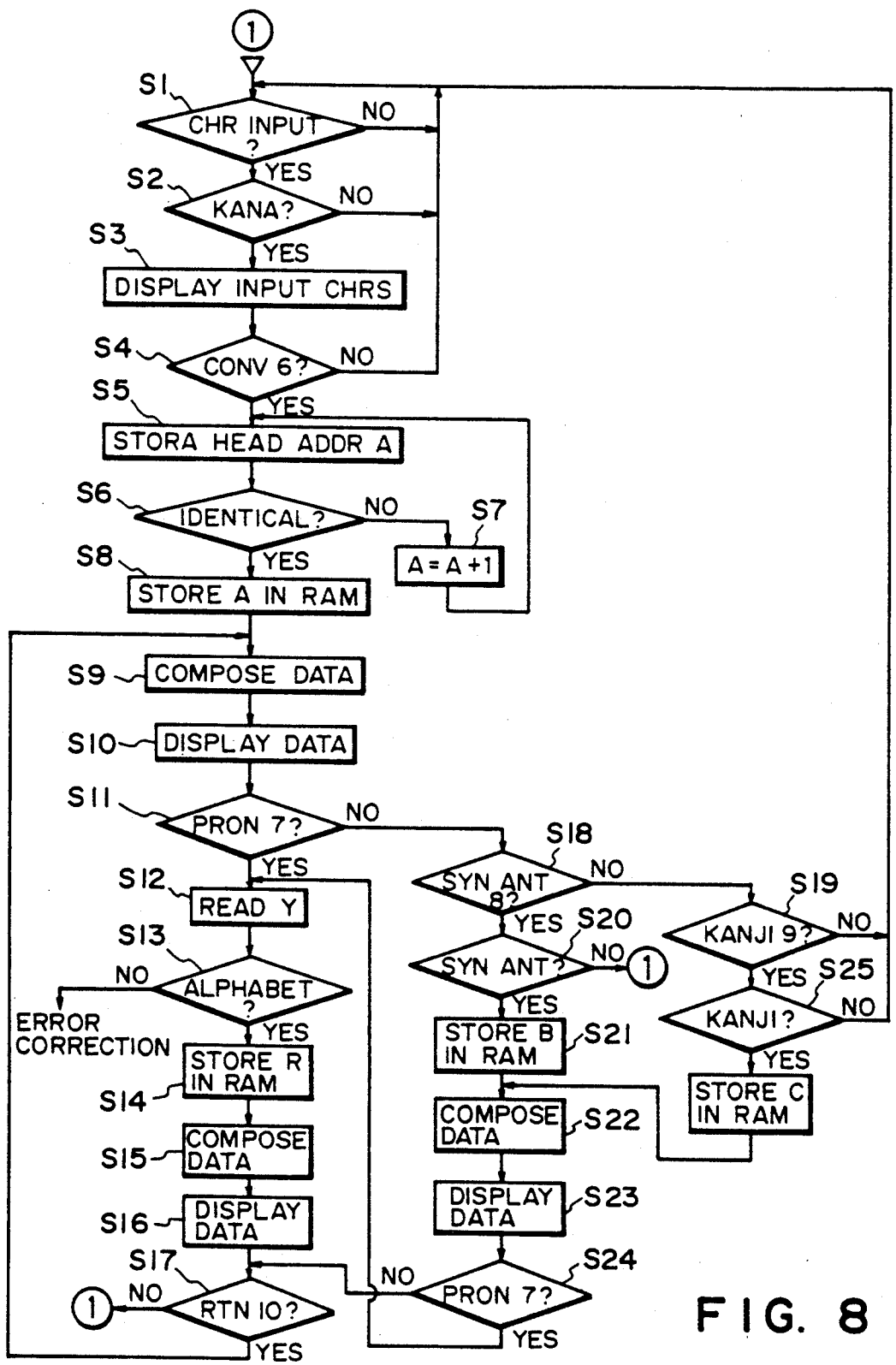
FIG. 8 is a flow chart illustrating the control procedure by CPU shown in FIG. 3.

Figure 8, "STORA" should read --STORE--.

COLUMN 1

Line 31, "prints"    should read --printed--.
    Line 51, change "output it" to --are outputted--.
    Line 61, change "this" to --his--.

COLUMN 5

Line 8, change "SYN/ANT flat" to --SYN/ANT flag--.

COLUMN 7

Line 24, change "are considered" to --is considered as--.
    Line 31, change "the of RAM 13" to --the SYN/ANT information B is stored in the work area 13a of RAM 13--.
    Line 54, change "abovedescribed" to --above-described--.

UNITED STATES PATENT AND TRADEMARK OFFICE
CERTIFICATE OF CORRECTION

PATENT NO. : 5,136,504

DATED : August 4, 1992

INVENTOR(S) : Hideo Fushimoto

It is certified that error appears in the above-identified patent and that said Letters Patent is hereby corrected as shown below:

COLUMN 8

```
Line  2, after "conventional" insert --device--.
Line 23, change "understood" to --understand--.
Line 24, change "understood" to --understand--.
```

COLUMN 10

```
Line 30, change "information" to --information;--.
```

Signed and Sealed this

Twelfth Day of October, 1993

Attest:

BRUCE LEHMAN

Attesting Officer

Commissioner of Patents and Trademarks